United States Patent
Meredith et al.

(10) Patent No.: US 9,749,830 B2
(45) Date of Patent: Aug. 29, 2017

(54) METHODS AND APPARATUS TO PROVIDE A COMMUNICATION SERVICE IN A REMOTE LOCATION

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Francisco Martinez, Cumming, GA (US); William Cottrill, Canton, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/955,918

(22) Filed: Dec. 1, 2015

(65) Prior Publication Data
US 2017/0156044 A1 Jun. 1, 2017

(51) Int. Cl.
*H04M 11/04* (2006.01)
*H04W 4/22* (2009.01)
*H04W 4/02* (2009.01)
*H04W 88/18* (2009.01)
(Continued)

(52) U.S. Cl.
CPC ............ *H04W 4/22* (2013.01); *H04W 4/025* (2013.01); *H04W 4/02* (2013.01); *H04W 64/00* (2013.01); *H04W 76/007* (2013.01); *H04W 88/182* (2013.01)

(58) Field of Classification Search
CPC ..... H04W 4/22; H04W 76/007; H04W 64/00; H04W 4/02; H04W 80/00; H04W 84/12; H04W 4/025; H04W 4/028; H04W 64/003; H04M 2242/04; H04M 11/04; H04M 2242/30; H04M 3/42348; H04M 3/42357
USPC ... 455/404.2, 404.1, 456.1, 414.1, 433, 521; 379/33, 221.11, 37, 39
See application file for complete search history.

(56) References Cited

U.S. PATENT DOCUMENTS 6,222,484 B1 4/2001 Seiple et al.
2010/0317317 A1* 12/2010 Maier ................... H04W 64/00
455/404.2
(Continued)

FOREIGN PATENT DOCUMENTS

WO 2012094716 7/2012

OTHER PUBLICATIONS

"How Loon Works," https://www.google.com/loon/how/, retrieved from the internet on Dec. 1, 2015, 7 pages.
(Continued)

*Primary Examiner* — Fred Casca
(74) *Attorney, Agent, or Firm* — Hanley, Flight & Zimmerman, LLC

(57) ABSTRACT

Methods, apparatus, systems and articles of manufacture are disclosed. An example method includes attempting to establish a remote communication path to a wireless network from a proxy, the proxy physically attached to a balloon. A determination is made as to whether an emergency procedure is to be performed. In response to a first determination that the remote communication path is established and that the emergency procedure is to be performed, a current location of the proxy is determined, and the current location of the proxy is transmitted to an emergency server.

20 Claims, 7 Drawing Sheets

(51) Int. Cl.
*H04W 76/00* (2009.01)
*H04W 64/00* (2009.01)

(56) References Cited

U.S. PATENT DOCUMENTS

| | | | | |
|---|---|---|---|---|
| 2012/0258734 | A1* | 10/2012 | Takahashi | H04M 1/72572 455/456.1 |
| 2013/0077597 | A1* | 3/2013 | Nukala | H04B 7/0417 370/330 |
| 2013/0177321 | A1* | 7/2013 | Devaul | H04B 10/1129 398/115 |
| 2013/0291787 | A1 | 11/2013 | Broussard, Jr. | |
| 2014/0031061 | A1* | 1/2014 | Thibault | H04W 4/027 455/456.1 |

OTHER PUBLICATIONS

"Halfbakery: Emergency Phone Range Extender," http://www.halfbakery.com/idea/Emergency_20Phone_20Range_20Extender, retrieved from the Internet on Dec. 1, 2015, 2 pages.
"Halfbakery: Emergency Phone Range Extender 2," http://www.halfbakery.com/idea/Emergency_20Phone_20Range_20Extender_202, retrieved from the internet on Dec. 1, 2015, 1 page.

* cited by examiner

METHODS AND APPARATUS TO PROVIDE A COMMUNICATION SERVICE IN A REMOTE LOCATION

FIELD OF THE DISCLOSURE

This disclosure relates generally to cellular communications, and, more particularly, to methods and apparatus to provide a communication service in a remote location.

BACKGROUND

Users of cellular communication devices rely on the ability to communicate when in remote locations. In some examples, users rely on the ability to use their cellular devices in the event of an emergency when in those remote locations. However, cellular coverage might not always be available and/or signal strength of the cellular coverage might not be strong enough to conduct a phone call or transmit a message (e.g., a call for help).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
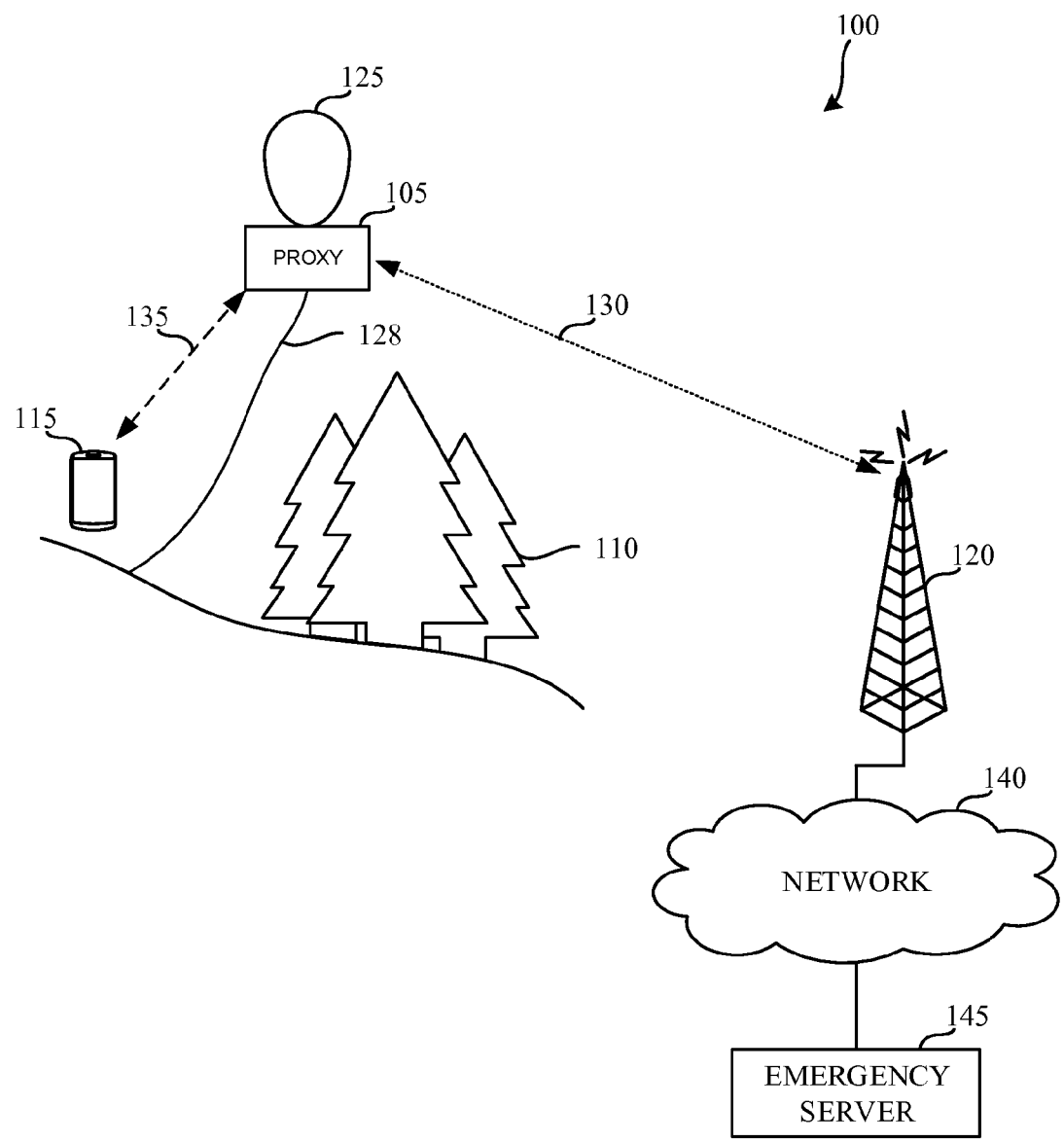
FIG. 1 is a diagram illustrating an example environment of use in which a proxy is to provide a communication service in a remote location.

Users that are outside of normal cellular coverage areas may experience difficulty communicating with a cellular tower. In some examples, users may be in an emergency and have a need to communicate (e.g., place a telephone call, send a text message, etc.). For example, the user may be in a remote location that does not have a reliable signal from the cellular tower. In such an example, enabling communication with the cellular tower involves (1) increasing transmission power to extend the communication range, and/or (2) reducing path losses to extend the communication range. Increasing transmission power is not always feasible because, for example, the cellular tower may already be transmitting at maximum power. For example, to increase a power by twelve decibels, the transmission power from the cellular tower might need to be increased by approximately twenty kilowatts. While such an increase will help the cellular tower sent information to the cellular device, such an increase does not impact the return path (e.g., from the cellular device to the cellular tower). Many cellular devices cannot increase their transmission power by twenty kilowatts. As a result, while the cellular device may receive information from the cellular tower, the cellular tower cannot receive information from the cellular device.

However, reducing path losses can be achieved by elevating a device receiving the cellular signal at the location of the user. For example, path loss is decreased at approximately six decibels per decade of height. As such, when a device receiving the cellular signal is elevated to twenty-four feet, received signal strength at the device is increased by approximately twelve decibels.

In examples disclosed herein, a proxy is attached to a balloon and is elevated with respect to the mobile device of the user. Elevating the proxy reduces path losses between the proxy and the cellular tower, thereby enabling a cellular connection between the proxy and the cellular tower. In examples disclosed herein, the proxy will typically be elevated high enough to clear trees or terrain and to establish a wireless network connection. When the proxy is elevated, the proxy searches for a network and registers on an identified network. Upon registering, the proxy opens a WiFi hotspot that is made available to the mobile device of the user. In some examples, the WiFi hotspot may be made available prior to the proxy registering on the cellular network.

The mobile device, still in the hands of the user, connects to the proxy using the WiFi hotspot. Because a line-of-sight is likely to be available between the mobile device and the proxy, connections can typically be established when the proxy is elevated up to approximately five hundred feet. The mobile device, via the proxy, may then make telephone calls, send short message service (SMS) messages, send and/or receive data, etc. via the proxy to the cellular network. In some examples, other mobile devices might connect to the same proxy as well, effectively forming a local area network.

In examples disclosed herein, the proxy may perform emergency procedures to assist in the event of an emergency. For example, a global positioning system (GPS) receiver on the proxy is turned on until a location is determined. The determined location may then be reported to an emergency server and/or may be reported to the mobile device. Utilizing a GPS antenna on the proxy is important because the user may be in terrain or a tree-line that prohibits GPS reception at the mobile device. In examples disclosed herein, the location is stored in a memory of the proxy. A proxy identity and the determined location can be automatically sent to a remote server used for recording this information and making it available to emergency teams.

Upon determining a location, the GPS receiver is turned off to minimize battery consumption. The GPS receiver can be reactivated on prescribed intervals such as 30 minutes and, if the GPS location has changed, the updated location may be transmitted to the remote server and the GPS receiver may be turned off again. In some examples, the GPS receiver may be turned on in response to a user request for help. If the location has not changed, the interval between GPS tests is may be increased to minimize battery consumption.

By utilizing the proxy, the mobile device has a hotspot connection. Accordingly, the mobile device can be used to make a telephone call to emergency or other persons, but this would be discouraged to minimize battery drain. The mobile device can further be used to directly take a picture and send the picture to the emergency server. In some examples, the proxy includes a camera that can capture and relay imagery to the emergency server for a positional reference. This does not preclude the ability to use the mobile device camera and to text or email the photo to someone and/or the emergency server. In some examples, the image is compressed to minimize transmission time and, accordingly, battery drain of the proxy.

In some examples, a condition of the user (e.g., an injury) could also prohibit them from a high degree of interaction with the proxy and/or the mobile device. If the proxy is turned on but isn't used to transmit any information within a prescribed timeout period (e.g., one hour), the example proxy transmits an emergency notification to a remote server and automatically contacts E911. An emergency server such as, for example, a public safety answering point (e.g., a point receiving E911 calls) receives the call and requests the device location. In some examples, the GPS receiver is remotely activated to identify a location of the proxy (e.g., if an accurate location is not known). If the proxy already has accurate GPS location, then the location is provided to the emergency server. Emergency notifications would subsequently occur once per thirty minutes and include the device ID and location information. In some examples, the emergency notifications include temperature measurements and/or barometric pressure measurements. Such temperature and/or barometric pressure measurements may be useful in locating the user.

In examples disclosed herein, the balloon is brightly colored. As such, when emergency responders arrive, exact location is easier. In some examples, different colors may be provided depending on, for example, a type of the terrain that the user will be in. For example, orange is used over water, yellow is used over trees, red or metallic is used over desert or rocky terrain, etc.

In some examples, multiple mobile devices may connect to a same proxy. In contrast to emergency situations discussed above, a larger balloon, powered from the ground via a conductor within and/or attached to a mooring cable can be used for improving communications for groups of users in a locality. As such, connectivity can be brought to locations that would otherwise have limited communication abilities. The proxy disclosed herein inexpensively enables connectivity for users who are on the fringe of coverage where installing new infrastructure (e.g., new cellular towers) is cost prohibitive. Even in first-world areas, the "edge of coverage" is a practical reality for millions of users in bad terrain (e.g., users in mountainous regions). As such, users at the edge of coverage benefit from a pseudo-permanent solution where the balloon is tethered with a high strength mooring cable, is regularly rechargeable (with helium or hydrogen), and, in some examples, uses a secured WiFi network.

FIG. 1 is a diagram illustrating an example environment of use 100 in which a proxy 105 is to provide communications services in a remote location. The example environment of use 100 includes an environmental impediment to communication 110 that prevents a mobile device 115 from directly communicating with a cellular tower 120. To enable the mobile device 115 to establish communications with the cellular tower 120, the proxy 105 is connected to a balloon 125 and is elevated such that the proxy 105 can communicate with the cellular tower 120. For example, the proxy 105 utilizes a remote communication path 130 that is not impeded by the environmental impediment 110. In the illustrated example of FIG. 1, the balloon 125 is elevated to a height that reduces path losses between the proxy 105 and the cellular tower 120. For example, when the proxy 105 is elevated by twenty-four feet, signal strength through the remote communication path 130 is increased by approximately twelve decibels, as compared to the signal strength between the mobile device 115 and the cellular tower. In examples disclosed herein, the balloon 125 and proxy 105 are moored to a location (e.g., a location on the ground) using a mooring cable 128.

In the illustrated example of FIG. 1, the example mobile device 115 communicates with the proxy 105 via a local communication path 135. The proxy 105 relays communications to and/or from the local communication path 135 via the remote communication path 130. Relaying communications enables the mobile device 115 to communicate with the network 140 and/or endpoints on the network such as, for example an emergency server 145.

In the illustrated example of FIG. 1, the example proxy 105 is a small, lightweight, communications relay that enables transmissions between the cellular tower 120 and the mobile device 115 that would otherwise not be possible due to the environmental impediment(s) 110. An example implementation of the example proxy 105 of FIG. 1 is further disclosed in connection with FIG. 3. In the illustrated example of FIG. 1, the example proxy 105 is attached to the balloon 125. In examples disclosed herein, the example proxy 105 is suspended from the balloon 125. However, in some examples, the example proxy 105 may be attached directly to a surface of the balloon 125 via a fastener such as, for example, a hook and loop fastener, glue, a snap, etc.

In the illustrated example of FIG. 1, the example environmental impediment to communication 110 is a tree. However, any other environmental impediment that reduces the signal strength between the cellular tower 120 and the mobile device 115 may additionally or alternatively be used. For example, the environmental impediment 110 may be a hill, a building, etc. In some examples, the environmental impediment 110 may be a long distance (e.g., ten miles) between the mobile device 115 and the cellular tower 120.

In the illustrated example of FIG. 1, the example mobile device 115 is a device capable of communicating with the proxy 105 and/or the cellular tower 120. The example mobile device 115 is typically implemented as a cellular phone. However, any other type of mobile device 115 may additionally or alternatively be used such as, for example, a tablet (e.g., an iPad®), a smartphone, etc. In some examples, the mobile device 115 may be a laptop computer. In some examples, the mobile device includes telephone functionality for placing a telephone call to the emergency server 145 (e.g., a public-safety answering point (PSAP)) via the proxy 105.

In the illustrated example of FIG. 1, the example cellular tower 120 communicates with the mobile device 115 and/or the proxy 105 using a cellular protocol (e.g., Global System for Mobile Communications (GSM), Universal Mobile Telecommunications System (UMTS), Evolution-Data Optimized (EDVO), Enhanced Data rates for GSM Evolution (EDGE), Long Term Evolution (LTE), etc.). In examples disclosed herein, the example cellular tower 120 includes a base station to enable the mobile device 115 and/or the proxy 105 to communicate with the network 140. In the illustrated example of FIG. 1, a single cellular tower 120 is shown. However, in implementation, a telecommunications service provider (e.g., AT&T, NTT DoCoMo, Vodaphone, Orange, etc.) will use many cellular towers 120 to provide as large of a cellular coverage area as possible. However, installing cellular towers in locations where few or no users are expected to use the telecommunications services provided by the cellular tower 120 is cost prohibitive. As a result, there are "fringe" areas of such telecommunications services (e.g., locations where a signal strength of the telecommunications services is low enough that services are unreliable and/or of low quality). In the illustrated example of FIG. 1, an antenna of the cellular tower 120 is elevated over the ground. Elevating the antenna of the cellular tower 120 reduces path losses when communicating with end devices. Likewise, elevating the end device (e.g., the proxy 105) reduces path losses when communicating with the cellular tower 120.

In the illustrated example of FIG. 1, the example balloon 125 is a mylar balloon. However, the balloon may be made of any other material. The example balloon is dimensioned such that, when inflated, the balloon 125 provides enough lift to elevate the proxy 105. Filling the balloon 125 involves using a valve on a gas cartridge that permits the contents of the cartridge to fill the balloon 125. An example gas cartridge is further disclosed in connection with FIG. 2. In examples disclosed herein, the balloon 125 has an exterior that is colored based on an intended location of use such that the balloon 125 stands out against the backdrop of the intended location of use. For example, if the balloon 125 were intended to be used in an area with a large number of trees (e.g., a forest), the balloon 125 may be colored orange or red such that it stands out against the trees. If the balloon were intended to be used in a desert terrain, the balloon 125 may be colored blue such that it stands out against the orange terrain. Using a complimentary color to an expected color of the intended location of use assists in easily locating the balloon by rescue personnel.

In the illustrated example of FIG. 1, the example mooring cable 128 is a lightweight cable used to prevent the balloon 125 from floating away. In some examples, the mooring cable 128 is also referred to as a tether. In examples disclosed herein, the example mooring cable 128 is a line that has a high strength to weight ratio (e.g., a 6 lb test line). In examples disclosed herein, the example mooring cable 128 is made of nylon. However, any other material may additionally or alternatively be used such as, for example, dacron, polyvinyl chloride, stainless steel, etc. In examples disclosed herein, the example mooring cable 128 is usable in light winds. In some examples, the mooring cable 128 may be usable in stronger winds (e.g., winds exceeding twenty miles per hour). In examples disclosed herein, the example mooring cable 128 is secured to a heavy object on the ground (e.g., a tree, a rock, an anchor, etc.) to prevent the balloon 125 from floating away as well as enable the user to use both hands to operate the mobile device 115. However, in some examples, the mooring cable 128 may not be secured to a heavy object, and instead may be, for example, held by a user. To retrieve the balloon 125, a user pulls the mooring cable 128 downward. In some examples, the balloon 125 may be re-lofted to again attempt to establish a cellular connection over the remote communication path 130. In some examples, the balloon 125 may be deflated (e.g. for easier transport to a different location) and re-inflated prior to lofting the balloon 125 at the different location.

In the illustrated example of FIG. 1, the example network 140 is a public network such as, for example, the Internet. However, in some examples, the network 120 may be implemented as a private area network such as, for example, a local area network (LAN), a virtual private network (VPN), etc. In the illustrated example of FIG. 1, the example network is a packet-switched network. However, any other type of network may additionally or alternatively be used such as, for example, a circuit switched network.

In the illustrated example of FIG. 1, the example emergency server 145 is a server hosted by an entity providing emergency services. In some examples, the emergency server 145 is implemented as a public-safety answering point (PSAP). In some examples, the entity may be a local emergency services provider such as, for example, a police service, a firefighting service, an ambulance service. However, in some examples, the entity may be a remote emergency services provider that may communicate information to the local emergency services provider.

In examples disclosed herein, the local communication path 135 is implemented using WiFi. However, any other past, present, and/or future type(s) and/or protocol(s) of communication path may additionally or alternatively be used such as, for example, Bluetooth. In examples disclosed herein, the local communication path 135 is wireless. However, in some examples, the local communication path 135 may use a wired connection (e.g., a universal serial bus (USB) connection, a serial connection, etc.) In examples where the local communication path 135 uses a wired connection, a wire may be connected to and/or embedded in the mooring cable 128 to enable the mobile device 115 to communicate with the proxy 105.

Figure 2:
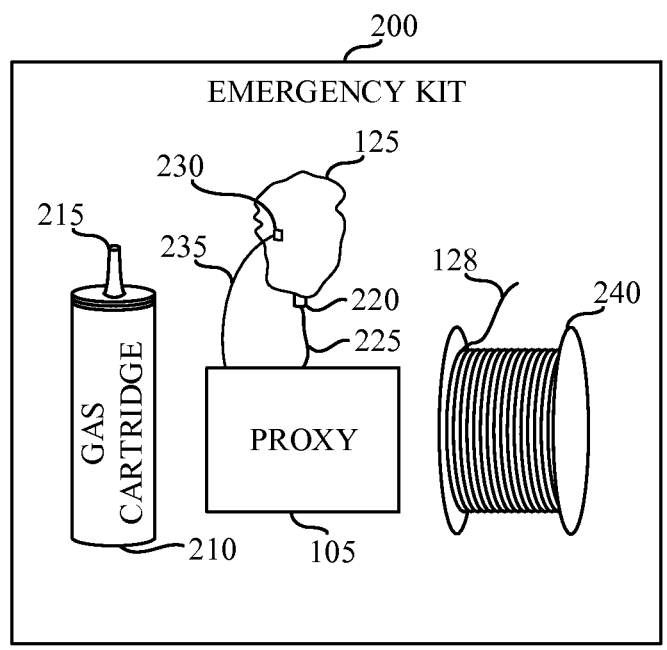
FIG. 2 is diagram illustrating an example emergency kit including the example proxy of FIG. 1.

FIG. 2 is diagram illustrating an example emergency kit 200 including the example proxy 105 of FIG. 1. In the illustrated example of FIG. 2, the example emergency kit 200 includes the proxy 105, the balloon 125, the mooring cable 128, and a gas cartridge 210. In examples disclosed herein, the example emergency kit 200 is designed to be sold as a product to end users that will be traveling to locations with poor telecommunications services reception (e.g., little or no cellular signal). By utilizing the example emergency kit 200 in the event of an emergency, the user may be able to utilize telecommunications services in a location where they otherwise would not be able to use such services.

The example gas cartridge 210 of the illustrated example of FIG. 2 is a single use cartridge. That is, the example cartridge 200 may be used one time before needing to be replaced. Using a single-use cartridge ensures that the physical dimensions of the cartridge are kept as small as possible, as users might prefer not to travel to remote locations with larger equipment than is necessary. In some examples, multiple gas cartridges 210 may be included in the emergency kit 200. However, in some examples, the gas cartridge 210 is a multi-use cartridge that may be used, for example, five times. Using a multi-use cartridge (or including multiple single use cartridges in the emergency kit) ensures that in the event of a failure to establish reliable telecommunications services after a first inflation of the balloon 125, the user may deflate the balloon 125, move to a different location, and re-inflate the balloon 125 using the cartridge 210. In the illustrated example of FIG. 2, the example cartridge is filled with helium. However, any other gas that, when used to inflate the balloon 125, provides enough lift to elevate the proxy 105 may additionally or alternatively be used. For example, the cartridge 210 may be filled with hydrogen, methane, etc. In some examples, the user may already be traveling with a gas container that may be used for another purpose such as, for example, a container storing methane to be used as a fuel source for a camping stove. In some examples, such other container may be usable to inflate the balloon 125. In such examples, the gas cartridge 210 may be omitted from the emergency kit 200.

In the illustrated example of FIG. 2, the example gas cartridge 210 includes a nozzle 215 used for inflating the balloon 125. In the illustrated example of FIG. 2, the nozzle 215 is an integral part of the gas cartridge 210. Including the nozzle 215 as an integral part of the gas cartridge reduces the number of separate pieces that the user must carry when traveling in the remote location (e.g., when hiking, camping, etc.). However, in some examples, the nozzle 215 may be separate from the gas cartridge 215. In some examples, the nozzle 215 may be used to inflate the balloon 125 with gas from a container other than the gas cartridge 210 (e.g., from a container storing methane to be used as a fuel source for a camping stove).

In the illustrated example of FIG. 2, the balloon 125 is in a deflated state. Providing and/or storing the balloon 125 in the deflated state enables the emergency kit 200 to be as compact as possible when not in use. In the illustrated example of FIG. 2, the example balloon 125 includes a valve 220 that may be used to safely deflate the balloon 125. In the illustrated example of FIG. 2, the valve 220 is dimensioned to receive the nozzle 215 for inflating the balloon 125.

In the illustrated example of FIG. 2, the example proxy 105 is connected to the balloon 125 using a cable 225. When deployed (e.g., when the balloon 125 is inflated), the proxy 105 is suspended directly below the balloon 125. In the illustrated example, the cable 225 is a short cable (e.g., less than one foot in length) to ensure that the proxy 105 is elevated as high as possible when the balloon 125 is deployed. However, the proxy 105 may be connected to the balloon 125 in any fashion. For example, the proxy 105 may be connected to an exterior of the balloon 125 using a fastener such as, for example, a hook-and-loop fastener, an adhesive, a magnet, a clip, a snap, etc. In the illustrated example of FIG. 2, the proxy 105 is detachable from the balloon 125 such that, in the event that the balloon 125 fails (e.g., the balloon is torn), a different balloon may be used.

In the illustrated example, of FIG. 2, an antenna 230 is connected to the surface of the balloon 125. Connecting the antenna 230 to the balloon 125 ensures that the antenna 230, which is used to communicate with the cellular tower 120, is elevated as high as possible. In the illustrated example of FIG. 2, the example antenna 230 is connected to the surface of the balloon 125 using a fastener such as, for example, an adhesive. In the illustrated example of FIG. 2, the example fastener connecting the antenna 230 to the balloon 125 is a non-removable fastener. However, a removable fastener may alternatively be used. In some examples, the antenna 230 may be integrated into a material of the balloon 125. For example, the antenna 230 may be disposed between two or more layers of mylar of the balloon 125. Integrating the antenna 230 into the material of the balloon 125 ensures that the antenna 230 does not unintentionally become disconnected from the balloon 125. In the illustrated example of FIG. 2, a single antenna is connected to the balloon 125. However, in some examples, multiple antennas are connected to the balloon 125. An example using multiple antennas is disclosed in connection with FIG. 3. Using multiple antennas enables the proxy 105 to selectively use an antenna that is receiving the strongest communications signal to the cellular tower 120.

In the illustrated example of FIG. 2, the example antenna 230 is electrically coupled to the proxy 105 by an electrical conductor 235. In the illustrated example of FIG. 2, the electrical conductor 235 is external to the balloon 125. However, in some examples, the electrical conductor 235 may be integrated into a material of the balloon 125 in whole or in part. For example, the electrical conductor may be integrated into the material of the balloon 125 between the antenna 230 and a location where it is convenient to connect the electrical conductor 235 to the proxy.

The example emergency kit 200 of FIG. 2 includes the mooring cable 128. In the illustrated example of FIG. 2, the mooring cable 128 is wound around a spool 240 to enable the user to deploy and/or collect the mooring cable 128 without risk of tangling the mooring cable 128. However, the example mooring cable 128 may additionally or alternatively be packaged in any other fashion.

Figure 3:
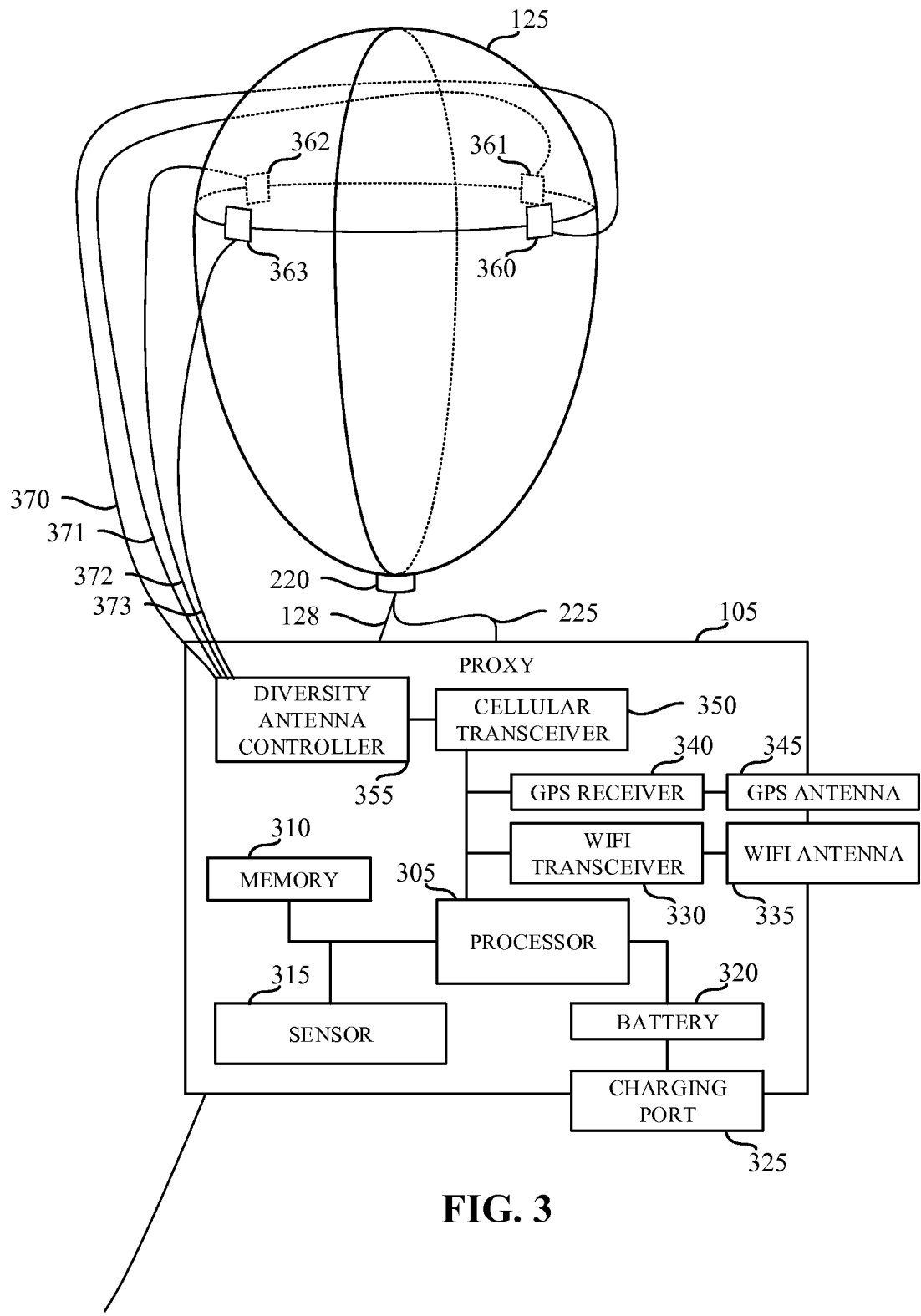
FIG. 3 is a block diagram of the example proxy of FIG. 1 elevated by the example balloon of FIG. 1.

FIG. 3 is a block diagram of the example proxy 105 of FIG. 1 elevated by the example balloon 125 of FIG. 1. In the illustrated example of FIG. 3, the example proxy 105 includes a processor 305, a memory 310, sensor 315, a battery 320, a charging port 325, a WiFi transceiver 330, a WiFi antenna 335, a GPS receiver 340, a GPS antenna 345, a cellular transceiver 350, and a diversity antenna controller 355. In the illustrated example of FIG. 3, the example proxy 105 is connected to the balloon 125 via the cable 225. In the illustrated example of FIG. 3, the balloon 125 includes four cellular antennas 360, 361, 362, 363. However, any number of cellular antennas may additionally or alternatively be used. The four cellular antennas 360, 361, 362, 363 are connected to the diversity antenna controller 355 via wires 370, 371, 372, 373.

The example processor 305 of the illustrated example of FIG. 3 controls operations of the proxy 105. In examples disclosed herein, the example processor 305 facilitates bridging of communications between the WiFi transceiver 330 and the cellular transceiver 350. In some examples, the processor 305 interacts with the GPS receiver 340 to identify a current location of the proxy 105. The example processor 305 may then communicate with an external entity (e.g., the emergency server 145) to convey the location information to assist in the providing of emergency services. In some examples, the example processor 305 monitors inputs received from the sensor 315 to determine whether operations should be performed.

The example memory 310 of the illustrated example of FIG. 3 is used to store location information of the proxy 105. In the illustrated example, location information is stored using a GPS Exchange Format. However, any other past, present, and/or future approach to storing location information may additionally or alternatively be used such as, for example, an extensible markup language (XML) format, a comma delimited format, a tab delimited format, a structured query language (SQL) format, etc. In examples disclosed herein, the example location data includes a geographic point defined by a latitude and a longitude. However, any other approach to representing a location may additionally or alternatively be used. In some examples, the location data additionally or alternatively includes elevation information, time information (e.g., a timestamp), an accuracy measurement, etc.

The example sensor 315 of the illustrated example of FIG. 3 is a switch that is used to indicate whether the user has requested that an emergency procedure be performed. For example, before deploying the balloon 125 and proxy 105, the user may enable the switch to indicate that the emergency procedure should be performed. When performing the emergency procedure, the example proxy 105 communicates with the emergency server 145 to indicate the location of the proxy 105. Conversely, the user may deploy the balloon 125 and proxy 105 without having enabled the switch, thereby indicating that the emergency procedure should not be performed. Not performing the emergency procedure may be useful in instances where, for example, the user is not in an emergency situation but wishes to communicate with another party.

In examples disclosed herein, the example sensor 315 may additionally or alternatively implement an environmental sensor. For example, the sensor 315 may implement an altimeter, a barometric sensor, a temperature sensor, etc. Gathering additional environmental measurements may facilitate the provisioning of emergency services. For example, whereas an altimeter reading from a GPS system might not be accurate, a barometric sensor representing an altitude may more accurately assist in locating the user.

In some examples, the example sensor 315 is a camera. In such examples, the camera may be used to capture images of the surroundings of the proxy 105. In such an example, the image may be transmitted to the emergency server 145 to assist in location of the user. In some examples, the camera is positioned towards the ground such that when an image is captured, the image can be used to identify a location of the user. For example, if the user were near a particular geographic feature (e.g., a river, a tree, etc.), emergency teams could focus their search for the user near the geographic feature.

In examples disclosed herein, to conserve weight and battery life, the example proxy 105 does not include a display. As such, the sensor 315 of FIG. 3 does not implement a touchscreen. Likewise, the sensor 315 does not implement a keyboard.

The example battery 320 of the illustrated example of FIG. 3 is a rechargeable battery. However, any other past, present, and/or future type of energy storage device may additionally or alternatively be used. For example, the battery 320 may be a non-rechargeable battery (e.g., a battery that is to be replaced upon depletion). In the illustrated example, the battery 320 is included as an internal component of the proxy 105 when packaged in the emergency kit 200 of FIG. 2. However, in some examples, the example battery 320 may be packaged as a separate item within the emergency kit 200.

The example charging port 325 of the illustrated example of FIG. 3 is used to charge the battery 320. In the illustrated example of FIG. 3, the example charging port 325 is a universal serial bus receptacle. As such, the example charging port 325 receives a universal serial bus plug to electrically charge the battery. In some examples a charging cable is included in the emergency kit 200 of FIG. 2 to facilitate charging of the battery 320. In some examples, a solar cell is used to charge the battery 320. In such an example, the solar cell may be positioned on a top of the balloon 125 to receive a maximum amount of exposure to sunlight for charging the battery 320.

The example WiFi transceiver 330 of the illustrated example of FIG. 3 enables communication between the proxy 105 and the mobile device 115. In the illustrated example the WiFi transceiver 330 implements an Institute of Electrical and Electronics Engineers (IEEE) 802.11n standard. However, any other past, present, and/or future communications protocol may additionally or alternatively be used.

In the illustrated example of FIG. 3, the example WiFi transceiver 330 communicates via the example WiFi antenna 335. The example WiFi antenna 335 of the illustrated example of FIG. 3 is external to a housing of the proxy 105. In some examples, the WiFi antenna may be connected to a surface of the balloon 125. However, in some examples, the example WiFi antenna 335 is internal to the housing of the proxy 105. In the illustrated example, the WiFi antenna 335 is a directional antenna. In such an example, the WiFi antenna 335 is oriented such that a radiating pattern of the WiFi antenna 335 provides a strongest signal strength downwards towards a user when the balloon 125 is deployed. In some examples, the example WiFi antenna 335 is an omnidirectional antenna.

The example GPS receiver 340 of the illustrated example of FIG. 3 receives positioning information via the example GPS antenna 345. In the illustrated example of FIG. 3, the example GPS receiver 340 determines a location of the proxy based on the received positioning information. The example GPS receiver 340 provides the positioning information to the processor 305. In the illustrated example, positioning information is received from one or more satellites orbiting the earth. To receive the positioning information, communications from the satellite(s) are received via the GPS antenna 345. In the illustrated example of FIG. 3, the GPS antenna 345 is external to the housing of the proxy 105. In some examples, the GPS antenna 345 is connected to the surface of the balloon 125 (e.g., a top surface of the balloon). Connecting the GPS antenna 345 to a surface of the balloon 125 reduces obstructions that might impede the reception of the positioning information. However, in some examples, the GPS antenna 345 may be internal to the housing of the proxy 105.

The example cellular transceiver 350 of the illustrated example of FIG. 3 enables wireless communication between the proxy 105 and the cellular tower 120. In the illustrated example of FIG. 3, the example cellular transceiver 350 communicates using a long term evolution (LTE) communication protocol. However, any other past, present, and/or future communication protocol and/or standards may additionally or alternatively be used. In the illustrated example of FIG. 3, the example cellular transceiver 350 communicates using the cellular antennas 360, 361, 362, 363 via the diversity antenna controller 355. The example diversity antenna controller 355 selects one or more of the cellular antennas 360, 361, 362, 363 to use for communication with the cellular tower 120. The example diversity antenna controller 355 selects one or more of the cellular antennas 360, 361, 362, 363 by communicating with the cellular tower 120 using one or more of the cellular antennas 360, 361, 362, 363 and recording a signal strength. The combination of one or more cellular antennas 360, 361, 362, 363 that yields the greatest signal strength is then selected and is used when communicating with the cellular tower 120. Over time, (e.g., as the balloon 125 is moved) the diversity antenna controller 355 may select one or more different antennas for communication with the cellular tower 120 as, for example, the balloon 125 may be rotated and thereby cause a signal strength of a first antenna (e.g., an initially selected antenna) to become lesser than a signal strength of a second antenna (e.g., an initially non-selected antenna).

The example cellular antennas 360, 361, 362, 363 of the illustrated example of FIG. 3 are connected to a surface of the balloon 125. In the illustrated example of FIG. 3, four cellular antennas 360, 361, 362, 363 are used. However, any other number of cellular antennas may additionally or alternatively be used. In the illustrated example of FIG. 3, the cellular antennas 360, 361, 362, 363 are positioned equidistant from each other around a middle of the balloon 125. However, the cellular antennas 360, 361, 362, 363 may be positioned in any other location (e.g., near a top of the balloon, near a bottom of the balloon, etc.). In some examples, the cellular antennas 360, 361, 362, 363 may be internal to a housing of the proxy 105.

The example wires 370, 371, 372, 373 of the illustrated example of FIG. 3 connect the example diversity antenna controller 355 to the cellular antennas 360, 361, 362, 363. In the illustrated example, of FIG. 3, the example wires 370, 371, 372, 373 include an electrical conductor. In the illustrated example of FIG. 3, the electrical conductor of each of the wires 370, 371, 372, 373 is external to the balloon 125. However, the electrical conductor of each of the wires 370, 371, 372, 373, and/or, more generally, the wires 370, 371, 372, 373 themselves, may be integrated into a material of the balloon 125 in whole or in part. For example, the wires 370, 371, 372, 373 may be integrated into the material of the balloon 125 between the antenna 230 and a location where it is convenient to connect the electrical conductor 235 to the diversity antenna controller 355. In some examples, the wires 370, 371, 372, 373 may be internal to the balloon 125.

While an example manner of implementing the example proxy 105 of FIG. 1 is illustrated in FIG. 3, one or more of the elements, processes and/or devices illustrated in FIG. 3 may be combined, divided, re-arranged, omitted, eliminated and/or implemented in any other way. Further, the example processor 305, the example memory 310, the example sensor 315, the example battery 320, the example charging port 325, the example WiFi transceiver 330, the example WiFi antenna 335, the example GPS receiver 340, the example GPS antenna 345, the example cellular transceiver 350, the example diversity antenna controller 355, the example antennas 360, 361, 362, 363, and/or, more generally, the example proxy 105 of FIGS. 1 and/or 3 may be implemented by hardware, software, firmware and/or any combination of hardware, software and/or firmware. Thus, for example, any of the example processor 305, the example memory 310, the example sensor 315, the example battery 320, the example charging port 325, the example WiFi transceiver 330, the example WiFi antenna 335, the example GPS receiver 340, the example GPS antenna 345, the example cellular transceiver 350, the example diversity antenna controller 355, the example antennas 360, 361, 362, 363, and/or, more generally, the example proxy 105 of FIGS. 1 and/or 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 305, the example memory 310, the example sensor 315, the example battery 320, the example charging port 325, the example WiFi transceiver 330, the example WiFi antenna 335, the example GPS receiver 340, the example GPS antenna 345, the example cellular transceiver 350, the example diversity antenna controller 355, the example antennas 360, 361, 362, 363, and/or, more generally, the example proxy 105 of FIGS. 1 and/or 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example proxy 105 of FIGS. 1 and/or 3 may include one or more elements, processes and/or devices in addition to, or instead of, those illustrated in FIG. 3, and/or may include more than one of any or all of the illustrated elements, processes and devices.

Figure 4:
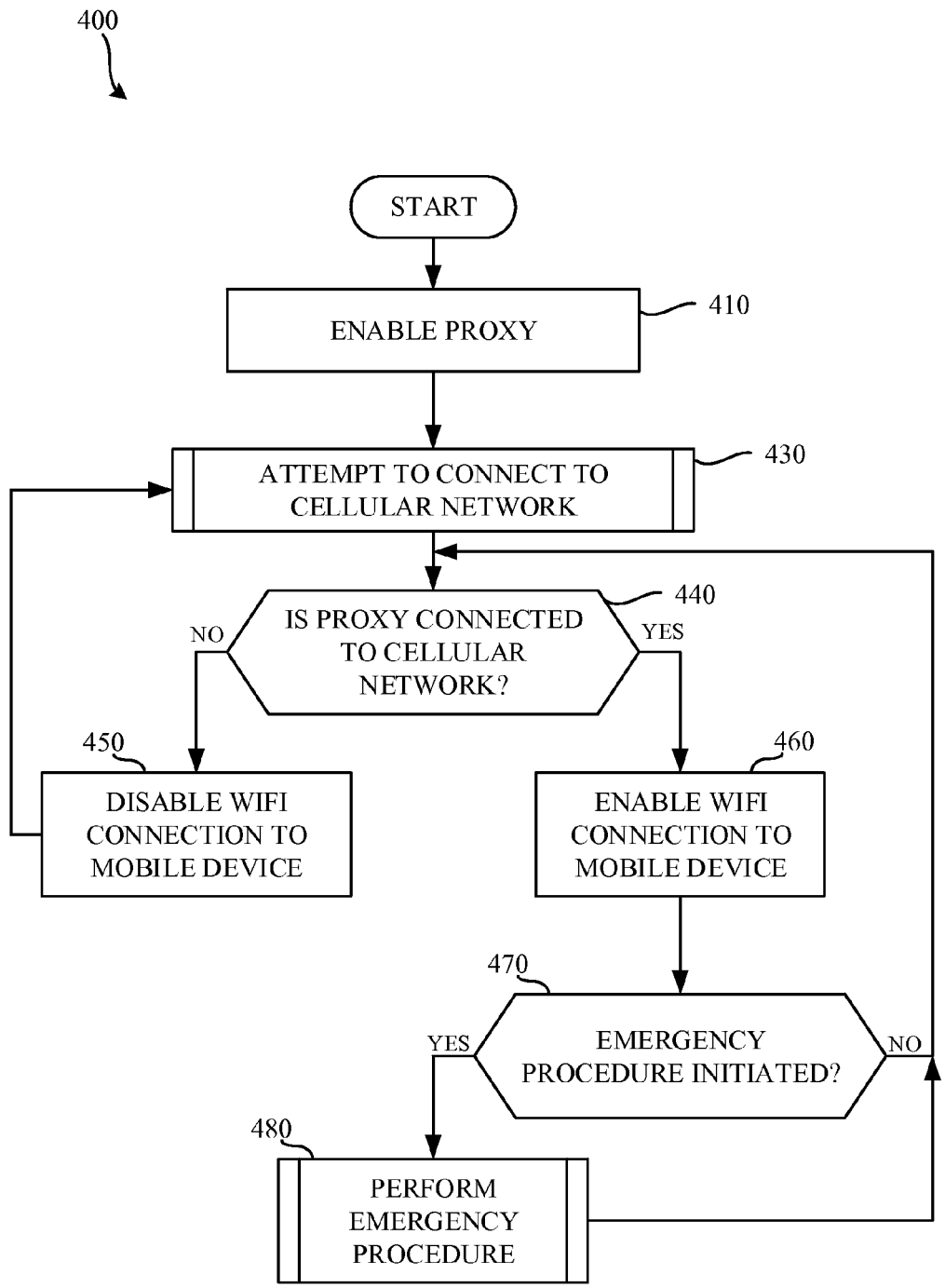
FIG. 4 is a flowchart representative of example machine readable instructions that may be executed to implement the example proxy of FIGS. 1 and/or 3.
Figure 5:
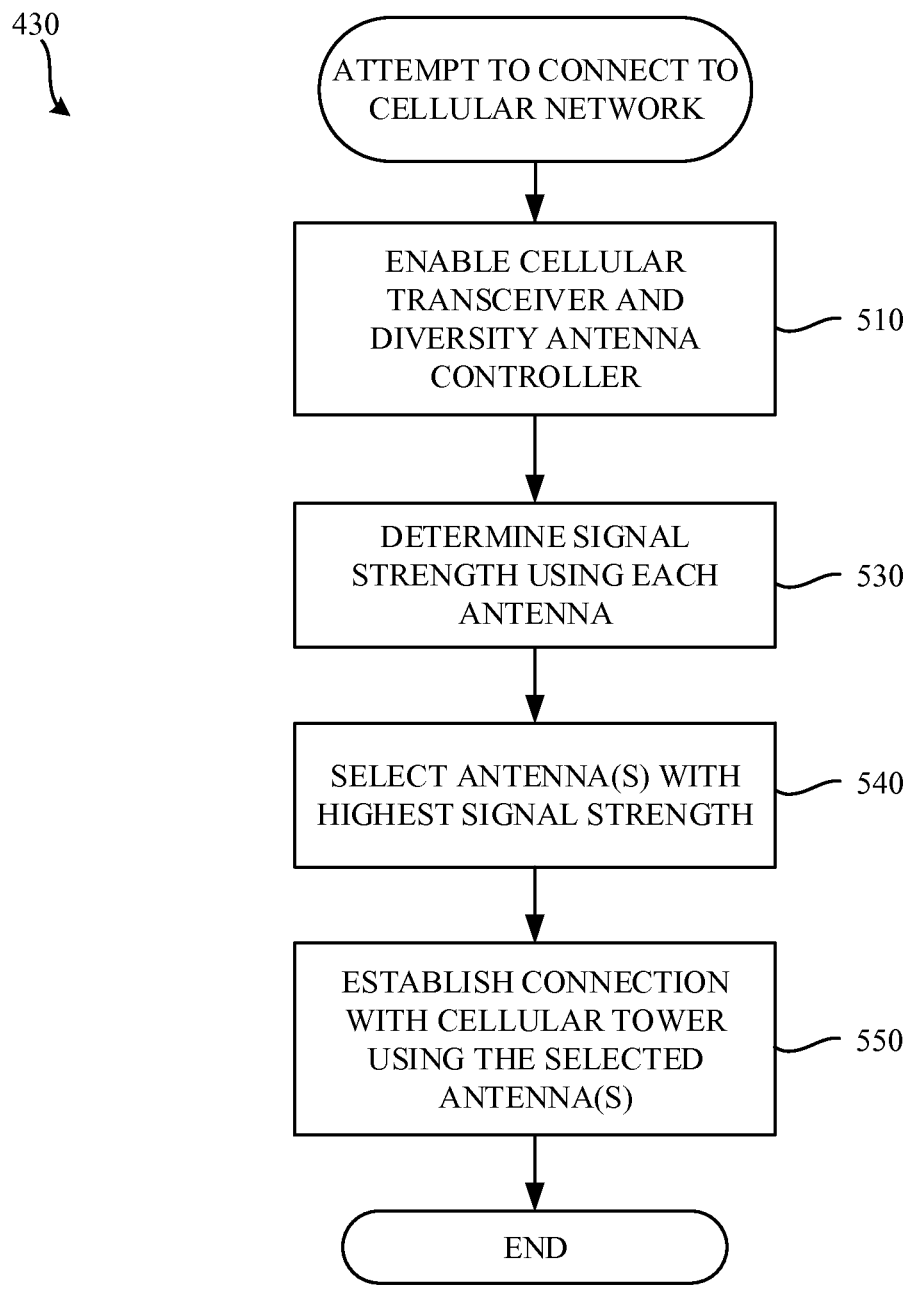
FIG. 5 is a flowchart representative of example machine readable instructions that may be executed to implement the example proxy of FIGS. 1 and/or 3 to connect to a cellular network.

Flowcharts representative of example machine readable instructions for implementing the proxy 105 of FIGS. 1 and/or 3 are shown in FIGS. 4, 5, and/or 6. In these examples, the machine readable instructions comprise a program(s) for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program(s) is/are described with reference to the flowchart(s) illustrated in FIGS. 4, 5, and/or 6, many other methods of implementing the example proxy 105 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example machine readable instructions that may be executed to implement the example proxy 105 of FIGS. 1 and/or 3. The example process of FIG. 4 begins when the processor 305 determines that the proxy 105 should be enabled (block 410). The example processor 305 determines that the proxy 105 should be enabled when a user input is received via the sensor 315 indicating that the proxy should be enabled. For example, the user may toggle a switch to enable the proxy 105. In some examples, the example processor 305 may determine that the proxy 105 is to be enabled when power is supplied to the processor 305 from the battery 320 (e.g., the user may enable the proxy 105 by connecting the battery 320).

The user then deploys the balloon 125 carrying the proxy 105. In the illustrated example of FIG. 4, the balloon 125 is deployed by inflating the balloon 125 using, for example, the gas cartridge 210 provided in the emergency kit 200, and allowing the balloon 125 to ascend (with the proxy 105 attached to the balloon 125) to a height defined by the length of the mooring cable 128. In some examples, the balloon 125 may be deployed to a height of twenty feet (e.g., the mooring cable 128 may be twenty feet long or may be secured to a location having twenty feet of length between the secured location and the balloon 125.) However, in some examples, the balloon 125 may be deployed to a higher altitude (e.g., one hundred feet, two hundred feet, etc.), to, for example, avoid any environmental impediments to communication such as, for example, trees.

The example processor 305 of the proxy 105 then attempts to establish a connection with the cellular tower 120 (block 430). Because the proxy 105 is elevated, path losses between the proxy 105 and the cellular tower 120 are reduced, thereby increasing a probability that the proxy 105 will be able to establish the connection with the cellular tower 120. FIG. 5, described in detail below, represents an example approach to establishing a connection with the cellular tower 120.

Returning to FIG. 4, the example processor 305 determines whether the connection has been established to the cellular tower 120 (block 440). In the illustrated example, the processor 305 determines whether the connection has been established by attempting to communicate via the cellular transceiver 350. In the illustrated example of FIG. 4, the example processor 305 attempts to communicate with a remote location such as, for example, the emergency server 145. If the connection has not been established (e.g., a response is not received from the emergency server 145) (block 440 returns a result of NO), the example processor 305 disables the WiFi transceiver 330 (block 450). Disabling the WiFi transceiver 330 reduces power consumption of the battery 320. When the WiFi transceiver 330 is disabled, the mobile device 115 will not see any available WiFi networks hosted by the proxy 105.

The processor 305 then continues to attempt to establish a connection with the cellular tower 120 (block 430). The example process of blocks 430, 440, and 450 is repeated until the example processor 305 detects that the connection has been established with the cellular tower 120 (block 440 returns a result of YES). The example processor 305 then enables the WiFi transceiver 330 (block 460). When enabled, the example WiFi transceiver 330 provides a WiFi network to the mobile device 115. In examples disclosed herein, the WiFi network provided to the mobile device 115 by the WiFi transceiver 330 is an open WiFi network (e.g., an unsecured network). Using an unsecured network relieves the user of having to input a password and/or configuration options when connecting the mobile device 115 to the WiFi network. Such an approach enhances the user safety by reducing the amount of time taken to establish communications with the emergency server 145. For example, a user who is in an emergency situation need not enter a password and/or configure a type of security used by the mobile device when communicating with the WiFi transceiver 330 of the proxy 105. However, in some examples, a secured WiFi network may be used. In some examples, information for connecting to the WiFi network is included in the emergency kit 200 and/or is printed on a housing of the proxy 105. Once the mobile device 115 has connected to the WiFi network hosted by the WiFi transceiver 330, the example processor 305 relays communications between the WiFi transceiver 330 and the cellular transceiver 350.

The example processor 305 determines whether an emergency procedure should be performed (block 470). The example processor 305 determines whether the emergency procedure should be performed by determining if an input has been received via the sensor 315 indicating that the emergency procedure is to be performed. For example, a switch may be set to a position to enable the emergency procedure. Additionally or alternatively, the example proxy 105 may receive an instruction from the mobile device 115 via the WiFi network hosted by the WiFi transceiver 330 to indicate that the emergency procedure should be performed. For example, the proxy 105 may host a web page that enables the user to control the operations of the proxy 105 and/or read diagnostic information of the proxy 105 (e.g., signal strength, GPS coordinates, etc.). In some examples, user inactivity may be used to trigger the emergency procedure. For example, if the mobile device 115 is connected to the WiFi network hosted by the WiFi transceiver 330 for a threshold period of time (e.g., one hour) without transmitting a threshold amount of data (e.g., one hundred kilobytes) and/or without placing a telephone call, the example processor 305 may determine that the user is in distress and may perform the emergency procedure.

In some examples, the user might not request the emergency procedure be performed. For example, the user may not be in an emergency situation and may, instead, simply wish to communicate using their mobile device but may not be receiving adequate signal strength to do so. If the emergency procedure is not to be initiated (block 470 returns a result of NO), control proceeds to block 440, where the example processor 305 confirms that the proxy 105 is connected to the cellular tower 120.

If the emergency procedure is to be initiated (block 470 returns a result of YES), the example processor 305 performs the emergency procedure (block 480). In some examples, the emergency procedure includes placing a call to a public safety answering point (PSAP). In some examples, the emergency procedure includes collecting and transmitting geolocation information to the emergency server 145. An example emergency procedure is described in further detail in connection with FIG. 6. Control then returns to block 440, where the example processor 305 confirms that the proxy 105 is connected to the cellular tower 120.

FIG. 5 is a flowchart representative of example machine readable instructions that may be executed to implement the example proxy 105 of FIGS. 1 and/or 3 to connect to a cellular network. The example process 430 of FIG. 5 begins when the processor 305 enables the cellular transceiver 350 and diversity antenna controller 355 (block 510). The example diversity antenna controller 355 determines a signal strength using each connected antenna. For example, with respect to the example antennas 360, 361, 362, 363 of FIG. 3, the example diversity antenna controller 355 gathers a signal strength reading using each of the antennas. In some examples, the example diversity antenna controller 355 takes sequential signal strength measurements of each of the antennas 360, 361, 362, 363. However, in some examples, the example diversity antenna controller 355 measures signal strength using multiple antennas at once (e.g., signal strengths of a first antenna and a second antenna may be measured at a same time). In some examples, the diversity antenna controller 355 measures signal strength using different combinations of antennas. For example, a measurement representing signal strength when using a first antenna (e.g., the antenna 360) and a third antenna (e.g., the antenna 362) may be gathered.

The example diversity antenna controller 355 selects antenna(s) having the highest signal strength (block 540). In examples disclosed herein, the signal strength measurements associated with each respective antenna are sorted and the antenna associated with the highest signal strength is selected. However, any other approach to selecting antenna(s) may additionally or alternatively be used. For example, antennas exhibiting greater than or equal to a signal strength threshold may be selected. Using the selected antennas, the example cellular transceiver 350 attempts to establish a connection with the cellular tower 120 (block 550). Control then returns to block 440 of FIG. 4, where the example processor 305 determines whether the connection has been established.

Figure 6:
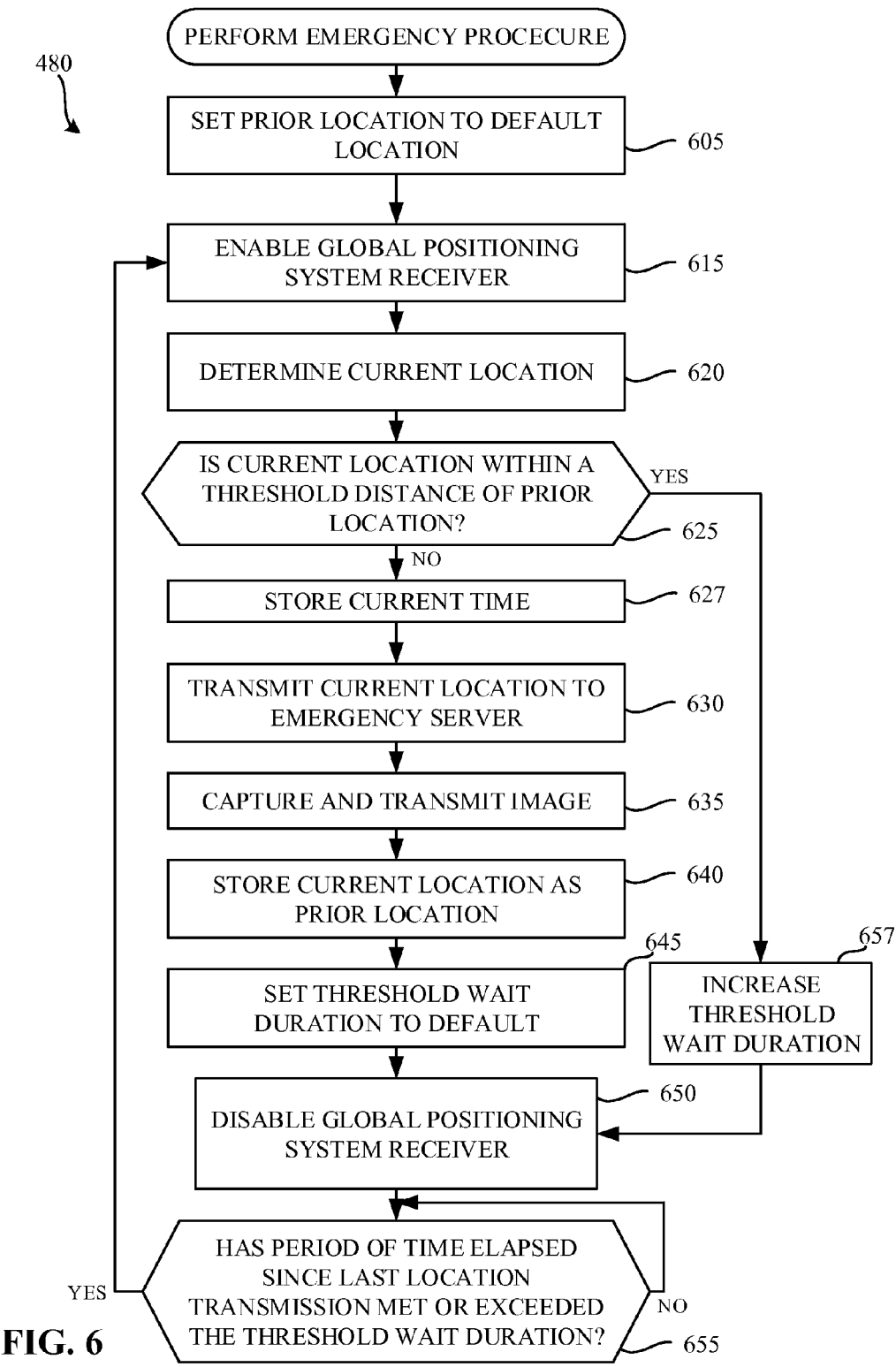
FIG. 6 is a flowchart representative of example machine readable instructions that may be executed to implement the example proxy of FIGS. 1 and/or 3 to perform an emergency procedure.

FIG. 6 is a flowchart representative of example machine readable instructions that may be executed to implement the example proxy 105 of FIGS. 1 and/or 3 to perform an emergency procedure 480. The example procedure 480 begins when the example processor 305 sets a prior location of the proxy 105 to a default location (block 605). In examples disclosed herein, the example processor 305 stores the prior location of the proxy 105 in the memory 310. In examples disclosed herein, the default location is a null location (e.g., a position having null coordinates). Using null coordinates indicates that the proxy is not actually at the null location. Moreover, using the null location ensures that the processor 305, when first comparing a determined location of the proxy 105 to a prior location of the proxy 105, will consider the proxy 105 to be in a new location, and transmit the current location of the proxy 105 to the emergency server 145.

The example processor 305 enables the GPS receiver 340 (block 615). The example processor 305 enables the GPS receiver 340 by providing power to the GPS receiver 340. In some examples, power may be provided to the GPS receiver 340 when the GPS receiver 340 is not enabled and, instead, the GPS receiver 340 may be put into a low power mode (e.g., sleep mode). The GPS receiver 340 determines a current location of the proxy 105 (block 620). In examples disclosed herein, the example GPS receiver 340 receives positioning information from one or more satellites via the GPS antenna 345, and uses the positioning information to calculate the current location of the proxy 105. In some examples, the GPS receiver 340 may interact with the cellular transceiver 350 to request assisted GPS (AGPS) data from the cellular tower 120. Using AGPS data received from the cellular tower 120 reduces an amount of time taken to accurately determine a location of the proxy 105. The current location of the proxy 105 is provided to the processor 305.

The example processor 305 determines whether the current location of the proxy 105 is within a threshold distance of the prior location of the proxy (block 625). Upon a first iteration of the process 480, the default location (e.g., null location) is used as the prior location, thereby causing the processor 305 to determine that the current location is not within a threshold distance of the prior location.

In the illustrated example, the threshold distance is one hundred feet. However, any other threshold distance may additionally or alternatively be used such as, for example, ten feet, fifty feet, two hundred feet, one thousand feet, a quarter mile, one mile, etc. If the current location of the proxy 105 is not within the threshold distance of the prior location (block 625 returns a result of NO), a notification including the current location of the proxy 105 is sent to the emergency server 145 (block 630). Using a threshold distance of one hundred feet ensures that updated notifications of the location are provided when the proxy is moved. If, for example, the threshold distance were set to a small distance (e.g., five feet, ten feet), small deviations in the determined current location may cause many notifications to be sent to the emergency server 145, thereby consuming more power from the battery 320 and reducing an expected run-time of the battery 320. Conversely, if, for example, the threshold distance were set to a large distance (e.g., a quarter mile, one mile, etc.), fewer location notifications would be transmitted even though the user may have moved the proxy 105, potentially frustrating a search effort for the user in the event of an emergency.

If the current location of the proxy 105 is not within the threshold distance of the prior location (block 625 returns a result of NO), the example processor 305 stores the current time in the memory 310 (block 327). In the illustrated example, the current time is compared against a threshold wait duration to determine when a subsequent determination of whether the current location is within the threshold distance of the prior location is performed. However, any other approach to determining whether a threshold amount of time has elapsed. For example, a timer may be started counting upwards towards a threshold, the timer may be started counting downwards from the threshold towards zero, etc.

The example processor 305 transmits, via the cellular transceiver 350, a notification including the current location of the proxy 105 to the emergency server 145 (block 630). In examples disclosed herein, the notification is sent using a structured data format such as, for example, an extensible markup language (XML) format. However, any other approach to arranging the notification may additionally or alternatively be used such as, for example, a plain text message, a comma separated value message, etc. In examples disclosed herein, the example notification includes the current location of the proxy 105 and an identifier of the proxy 105. However, in some examples, additional information may be sent such as, for example, a reading from the sensor 315 may be transmitted with the notification, an indication of remaining battery power may be transmitted, an indication of the cellular signal strength may be transmitted, etc. The notification is used by the emergency server 145 to provide emergency services to the user of the proxy 105.

In the illustrated example of FIG. 6, the processor 305 captures an image via the sensor 315 (which implements an image sensor). In such examples, the sensor 315 may be used to capture images of the surroundings of the proxy 105. In such an example, the image is transmitted to the emergency server 145 (block 635), and may be used to assist in location of the user. In some examples, the sensor 315 is positioned towards the ground such that when an image is captured, the image can be used to identify a location of the user. For example, if the user were near a particular geographic feature (e.g., a river, a tree, etc.), an emergency team could focus their search for the user near the geographic feature.

The example processor 305 stores the current location of the proxy 105 as the prior location in the memory 310 (block 640). Storing the current location as the previous location enables future comparisons using the current location of the proxy 105 to determine whether subsequent notifications should be sent to the emergency server 145.

The example processor 305 sets a threshold wait duration to a default threshold wait duration (block 645). The threshold wait duration is used to determine when a subsequent determination of whether the current location of the proxy 105 is within the threshold distance of the prior location of the proxy 105. In the illustrated example of FIG. 6, the threshold wait duration is set to one minute. However, any other threshold wait duration may alternatively be used such as, for example, thirty seconds, two minutes, five minutes, etc.

The example processor 305 disables the GPS receiver 340 (block 650). Disabling the GPS receiver reduces power consumption and extends battery life. In the illustrated example of FIG. 6, the example processor 305 disables the GPS receiver 340 by preventing power from being provided to the GPS receiver 340. However, in some examples, the processor 305 disables the GPS receiver 340 by instructing the GPS receiver to enter a low power mode (e.g., a sleep mode).

The example processor 305 determines whether a period of time elapsed since a prior determination that the current location of the proxy 105 was not within the threshold distance of the prior location (block 655). In the illustrated example, the example processor 305 determines whether the period of time elapsed since the prior determination that the current location of the proxy 105 was not within the threshold distance of the prior location by calculating a difference between the time stored in connection with block 627 and the current time, and comparing the calculated difference to the threshold wait duration. If the period of time does not meet or exceed the threshold wait duration (block 655 returns a result of NO), the example processor 305 continues to wait until the period of time meets or exceeds the threshold wait duration (block 655 returns a result of YES). The example process of blocks 615 through 655 repeats. In some examples, the process 480 may be terminated if, for example, the processor 305 receives an instruction to terminate the emergency procedure, the battery 320 is exhausted, a connection to the cellular tower 120 is lost, etc.

Returning to block 625, in some examples, the current location of the proxy 105 is within the threshold distance of the prior location of the proxy 105 (block 625 returns a result of YES). In such examples, the example processor 305 increases the threshold wait duration (block 657) and disables the GPS receiver 340 (block 650). Increasing the threshold wait duration causes the processor 305 to wait for progressively longer periods of time when it is determined that the proxy 105 has not moved away from a prior location. In examples disclosed herein, the threshold wait duration is increased by five minutes. However, any other approach to increasing the threshold wait duration may additionally or alternatively be used. For example, the threshold wait duration may be doubled (e.g., one minute, two minutes, four minutes, eight minutes, sixteen minutes, thirty-two minutes, etc.). In some examples, the threshold wait duration is increased up to a maximum threshold wait duration such as, for example one hour. However, any other maximum threshold wait duration may additionally or alternatively be used. The example process of blocks 615 through block 657 is repeated. In some examples, after increasing the threshold wait duration (block 657), control proceeds to block 630, where the example processor 305 transmits the current location to the emergency server. In such an example, the example processor 305 omits block 645 (i.e., the threshold wait duration is not reset). Using such an approach, the location of the proxy 105 is transmitted using progressively longer intervals (perhaps up to a maximum interval) when the proxy 105 is determined to be in a same location. As noted above, in some examples, the process 480 may be terminated if, for example, the processor 305 receives an instruction to terminate the emergency procedure, the battery 320 is exhausted, a connection to the cellular tower 120 is lost, etc.

Figure 7:
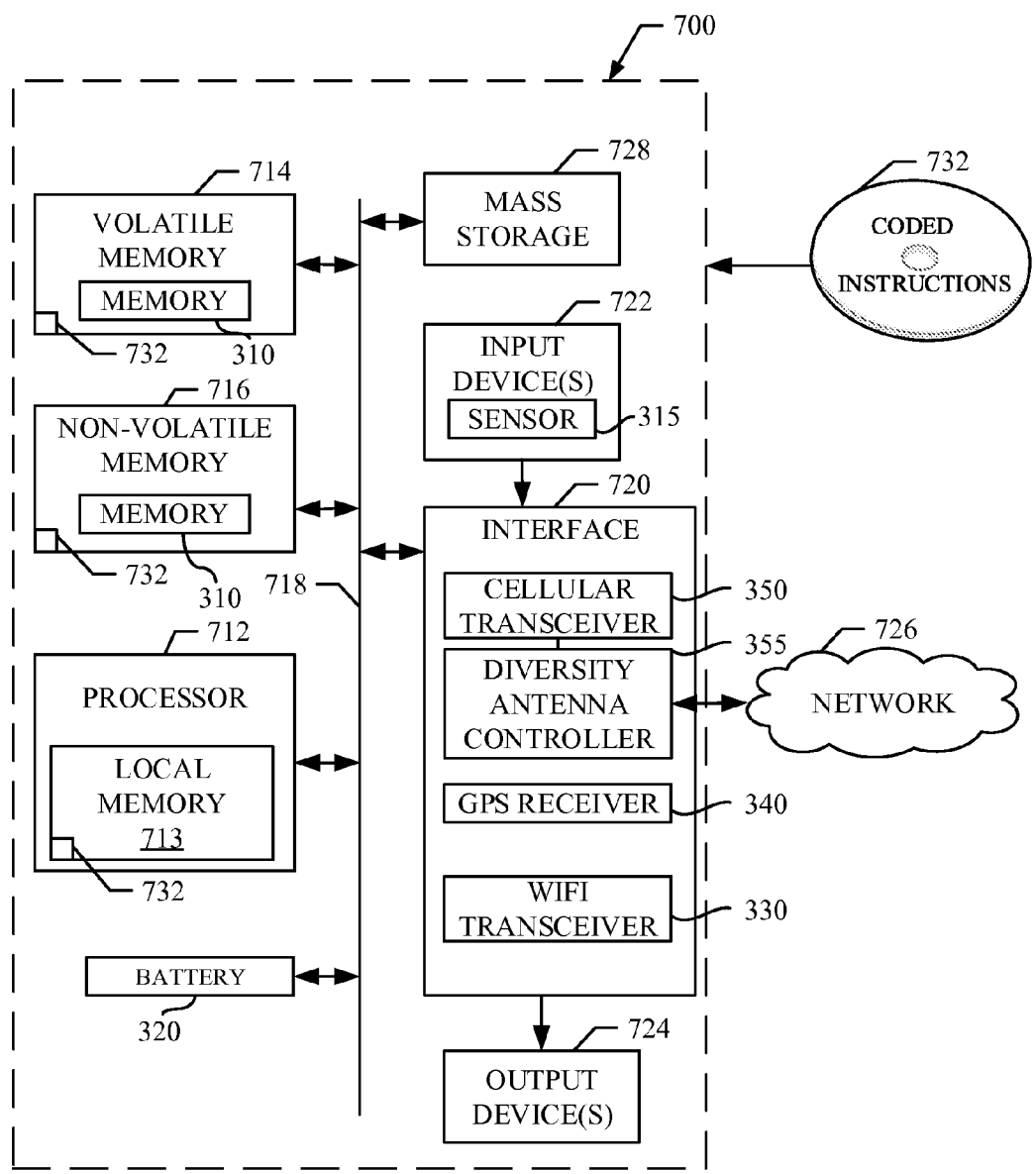
FIG. 7 is a block diagram of an example processor platform structured to execute the example machine readable instructions of FIGS. 4, 5, and/or 5 to implement the example proxy of FIGS. 1 and/or 3.

FIG. 7 is a block diagram of an example processor platform 700 capable of executing the instructions of FIGS. 4, 5, and/or 6 to implement the example proxy 105 of FIGS. 1 and/or 3. The processor platform 700 can be, for example, a server, a personal computer, a mobile device (e.g., a cell phone, a smart phone, a tablet such as an iPad™), a personal digital assistant (PDA), an Internet appliance, a personal video recorder, or any other type of computing device.

The processor platform 700 of the illustrated example includes a processor 712. The example processor 712 of the illustrated example of FIG. 7 may be used to implement the example processor 305 of FIG. 3. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. The example volatile memory 714 and/or the example non-volatile memory 716 may be used to implement the example memory 310 of FIG. 3.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The example input device 722 may be used to implement the example sensor 315 of FIG. 3. The input device(s) can be implemented by, for example, an audio sensor, a microphone, a camera (still or video), a button, a barometric sensor, a switch, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED)), a buzzer, and/or speakers.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a cellular telephone system, etc.). In examples disclosed herein, the example interface circuit 720 may be used to implement the example WiFi transceiver 330, the example GPS receiver 340, the example cellular transceiver 350, and/or the example diversity antenna controller 355.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture enable communication in a remote location where such communication is ordinarily not possible. In examples disclosed herein, the proxy 105 is attached to a balloon 125 that is deployed (e.g., elevated) to reduce path losses between the proxy 102 and the cellular tower 120. In examples disclosed herein, the proxy 105 will typically be elevated high enough to clear trees or terrain and to establish a wireless network connection. Elevating the proxy 105 increases signal strength between the proxy 105 and the cellular tower 120. In turn, the proxy 105 operates more efficiently because the proxy 105 does not need to constantly attempt to connect to the cellular tower 120. Conversely, transmission power at the cellular tower 120 need not be increased to facilitate communication between the cellular tower 120 and the proxy 105.

Moreover, when performing an emergency procedure, the example proxy 105 disables the GPS receiver 340 of the proxy 105 during wait periods. Disabling the GPS receiver 340 enhances power efficiency of the proxy 105 because less power is consumed while the GPS receiver 340 is in a disabled state. Likewise, the example proxy 105 disables the WiFi transceiver 330 of the proxy 105 when a communication connection to the cellular tower 120 is not available. Disabling the WiFi transceiver 330 enhances power efficiency of the proxy 105 because less power is consumed while the WiFi transceiver 330 is in a disabled state. Increasing power efficiency results in longer battery life of the battery 320 of the proxy.

Furthermore, in some examples, the example proxy 105 utilizes a diversity antenna controller 355 to measure a signal strength in association with antennas 360, 361, 362, 363 attached to a surface of the balloon 125. The diversity antenna controller 355 increases communication efficiency between the proxy 105 and the cellular tower 120 because antenna(s) having the greatest signal strength(s) are selected for usage instead of antenna(s) that have lower signal strength(s).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to provide a communication service in a remote location, the method comprising:
    attempting to establish, by executing an instruction with a processor located in a proxy, a remote communication path to a wireless network from the proxy, the proxy physically attached to a balloon, the proxy to provide a local communication path between the proxy and a mobile device;
    determining that (1) the remote communication path is established;
    determining that (2) an emergency procedure instruction received at the processor from the mobile device via the local communication path indicates that an emergency procedure is to be performed;
    in response to (1) the determination that the remote communication path is established and (2) the determination that the emergency procedure instruction received at the processor from the mobile device via the local communication path indicates that the emergency procedure is to be performed:
        interfacing, by executing an instruction with the processor located in the proxy, with a global positioning system receiver located in the proxy to determine a current location of the proxy, the proxy separate from the mobile device; and
        transmitting, from the proxy, the current location of the proxy to an emergency server.

2. The method as defined in claim 1, further including, in response to a second determination that the remote communication path is established:
    enabling the local communication path between the proxy and the mobile device; and
    relaying communications between the local communication path and the remote communication path.

3. The method as defined in claim 2, further including in response to a third determination that the remote communication path is not established, disabling, with the processor, the local communication path between the proxy and the mobile device.

4. The method as defined in claim 1, further including calculating a distance between the current location of the proxy and a prior location of the proxy, wherein the current location of the proxy is transmitted when the distance exceeds a threshold distance.

5. The method as defined in claim 4, further including disabling the global positioning system receiver of the proxy after the determination of the current location of the proxy and before a subsequent determination of the current location of the proxy, the global positioning system receiver disabled for a threshold period of time.

6. The method as defined in claim 5, further including increasing the threshold period of time when the distance does not exceed the threshold distance.

7. The method as defined in claim 1, wherein the attempting to establish the remote communication path includes:
    determining signal strengths associated with respective antennas attached to a surface of the balloon; and
    selecting at least one of the antennas having a greatest respective signal strength.

8. A tangible machine readable storage medium comprising instructions which, when executed, cause a processor located in a proxy to perform a method comprising:
    attempting to establish a remote communication path to a wireless network from a proxy, the proxy physically attached to a balloon, the proxy to provide a local communication path between the proxy and a mobile device;
    determining that (1) the remote communication path is established;
    determining that (2) an emergency procedure instruction received at the processor from the mobile device via the local communication path indicates that an emergency procedure is to be performed;
    in response to (1) the determination that the remote communication path is established and (2) the determination that the emergency procedure instruction received at the processor from the mobile device via the local communication path indicates that the emergency procedure is to be performed:
        interfacing with a global positioning system receiver located in the proxy to determine a current location of the proxy, the proxy separate from the mobile device; and transmitting the current location of the proxy to an emergency server.

9. The tangible machine readable storage medium as defined in claim 8, wherein the instructions, when executed, cause the processor of the proxy to, in response to a second determination that the remote communication path is established:
enable the local communication path between the proxy and a mobile device; and
relay communications between the local communication path and the remote communication path.

10. The tangible machine readable storage medium as defined in claim 9, wherein the instructions, when executed, cause the processor of the proxy to, in response to a third determination that the remote communication path is not established, disable the local communication path between the proxy and the mobile device.

11. The tangible machine readable storage medium as defined in claim 8, wherein the instructions, when executed, cause the processor of the proxy to calculate a distance between the current location of the proxy and a prior location of the proxy, wherein the current location of the proxy is transmitted when the distance exceeds a threshold distance.

12. The tangible machine readable storage medium as defined in claim 11, wherein the instructions, when executed, cause the processor of the proxy to disable a global positioning system receiver of the proxy after the determination of the current location of the proxy and before a subsequent determination of the current location of the proxy, the global positioning system receiver disabled for a threshold period of time.

13. The tangible machine readable storage medium as defined in claim 12, wherein the instructions, when executed, cause the processor of the proxy to increase the threshold period of time when the distance does not exceed the threshold distance.

14. The tangible machine readable storage medium as defined in claim 8, wherein the instructions, when executed, cause the processor of the proxy to:
determine signal strengths associated with respective antennas attached to a surface of the balloon; and
select at least one of the antennas having a greatest respective signal strength.

15. An apparatus comprising:
a processor;
a global positioning system receiver; and
a memory to store machine readable instructions that, when executed by the processor, cause the processor to perform operations comprising:
attempting to establish a remote communication path to a wireless network from the apparatus, the apparatus physically attached to a balloon, the apparatus to provide a local communication path between the apparatus and a mobile device;
determining that (1) the remote communication path is established;
determining that (2) an emergency procedure instruction received at the processor from the mobile device via the local communication path indicates that an emergency procedure is to be performed;
in response to (1) the determination that the remote communication path is established and (2) the determination that the emergency procedure instruction received at the processor from the mobile device via the local communication path indicates that the emergency procedure is to be performed:
interfacing with the global positioning system receiver to determine a current location of the apparatus, the apparatus separate from the mobile device; and
transmitting the current location of the apparatus to an emergency server.

16. The apparatus as defined in claim 15, wherein the instructions, when executed, cause the processor to, in response to a second determination that the remote communication path is established:
enable the local communication path between the apparatus and a mobile device separate from the apparatus; and
relay communications between the local communication path and the remote communication path.

17. The apparatus as defined in claim 16, wherein the instructions, when executed, cause the processor to, in response to a third determination that the remote communication path is not established, disable a WiFi transceiver providing the local communication path.

18. The apparatus as defined in claim 15, wherein the instructions, when executed, cause the processor to calculate a distance between the current location of the apparatus and a prior location of the apparatus, wherein the current location of the apparatus is transmitted when the distance exceeds a threshold distance.

19. The apparatus as defined in claim 18, wherein the instructions, when executed, cause the processor to disable a global positioning system receiver after the determination of the current location of the apparatus and before a subsequent determination of the current location of the apparatus, the global positioning system receiver disabled for a threshold period of time.

20. The apparatus as defined in claim 19, wherein the instructions, when executed, cause the processor to increase the threshold period of time when the distance does not exceed the threshold distance.

* * * * *